(12) United States Patent
Fang et al.

(10) Patent No.: US 8,537,100 B2
(45) Date of Patent: Sep. 17, 2013

(54) BACKLIGHT MODULE AND DISPLAY APPARATUS

(75) Inventors: Lindong Fang, Shenzhen (CN); Yicheng Kuo, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 263 days.

(21) Appl. No.: 12/996,350

(22) PCT Filed: Nov. 4, 2010

(86) PCT No.: PCT/CN2010/078436
§ 371 (c)(1),
(2), (4) Date: Dec. 3, 2010

(87) PCT Pub. No.: WO2012/012980
PCT Pub. Date: Feb. 2, 2012

(65) Prior Publication Data
US 2012/0113155 A1 May 10, 2012

(51) Int. Cl.
*G09G 3/36* (2006.01)
(52) U.S. Cl.
USPC .............................. 345/102; 349/65; 362/600
(58) Field of Classification Search
USPC .................. 345/102; 349/61, 62, 65; 362/26, 362/27, 600–609, 611, 615, 616
See application file for complete search history.

(56) References Cited

U.S. PATENT DOCUMENTS

| 6,452,649 B1* | 9/2002 | Ono et al. ........................ 349/61 |
| 2001/0017774 A1 | 8/2001 | Ito et al. |
| 2008/0291696 A1* | 11/2008 | Kim et al. ..................... 362/623 |
| 2009/0103006 A1* | 4/2009 | Cadio et al. ..................... 349/64 |
| 2009/0116261 A1 | 5/2009 | Chen et al. |
| 2010/0118514 A1* | 5/2010 | Cho et al. ..................... 362/97.1 |

FOREIGN PATENT DOCUMENTS

| CN | 2904010 Y | 5/2007 |
| CN | 101334550 A | 12/2008 |
| CN | 101414079 A | 4/2009 |
| CN | 101603658 A | 12/2009 |
| CN | 101737678 A | 6/2010 |
| EP | 0308828 A2 | 3/1989 |
| JP | 2010-033861 A | 2/2010 |
| JP | 2010044900 A | 2/2010 |

\* cited by examiner

*Primary Examiner* — Regina Liang
(74) *Attorney, Agent, or Firm* — Ditthavong Mori & Steiner, P.C.

(57) ABSTRACT

The present invention provides a backlight module and a display apparatus. The backlight module comprises at least two light sources; a plurality of light guide units corresponding to the light sources and disposed at one side thereof; and at least one reflective layer formed between the two adjacent light sources, wherein a portion of the reflective layer extends between two of the light guide units corresponding to the two light sources. The present invention can enhance the number of the locally dimmed regions and improve the light interference problem between the different lighting regions.

8 Claims, 6 Drawing Sheets

BACKLIGHT MODULE AND DISPLAY APPARATUS

FIELD OF THE INVENTION

The present invention relates to a backlight module and a display apparatus, and more particularly to a backlight module and a display apparatus capable of local dimming.

BACKGROUND OF THE INVENTION

Liquid crystal displays (LCDs) have been widely applied in electrical products. Currently, most of LCDs are backlight type LCDs, and comprise a liquid crystal panel and a backlight module. According to the position of the light sources, the backlight module can be classified into a side-light type or a direct-light type, in order to provide LCDs with backlight sources.

Currently, the backlight module of the LCD can have a plurality of lighting regions, and the brightness thereof in the different lighting regions can be adjusted. In a local dimming method, light emitting diode (LED) chips are disposed at two opposite side of a light guide plate, and the light guide plate can have different lighting regions by controlling the lighting of the different LEDs. However, in this local dimming method, the lighting of a center region of the light guide plate is uneasy to be dimmed. That is, the center region of the backlight module can not be dimmed, and the regions capable of locally dimming are fewer, thereby deteriorating the controlling effect of the local dimming thereof. Furthermore, in this local dimming method, the light between the different lighting regions is easy to influence each other, thereby significantly the local dimming effect.

As a result, it is necessary to provide a backlight module and a display apparatus to solve the problems existing in the conventional technologies, as described above.

SUMMARY OF THE INVENTION

A primary object of the present invention is to provide a backlight module, wherein the backlight module comprises: at least two light sources; a plurality of light guide units corresponding to the light sources and disposed at one side of the light sources; and at least one reflective layer formed between the two adjacent light sources, wherein a portion of the reflective layer extends between two of the light guide units corresponding to the two light sources.

A secondary object of the present invention is to provide a display apparatus, wherein the display apparatus comprises a display panel and a backlight module. The backlight module comprises: at least two light sources; a plurality of light guide units corresponding to the light sources and disposed at one side of the light sources; and at least one reflective layer formed between the two adjacent light sources, wherein a portion of the reflective layer extends between two of the light guide units corresponding to the two light sources.

A further object of the present invention is to provide a backlight module, wherein the backlight module comprises: at least two light sources; a plurality of light guide units corresponding to the light sources and disposed at one side of the light sources, wherein a reflective surface is formed on a portion of a bottom surface, an end surface or an inclined end surface of each of the light guide units, and the reflective surface is a reflective sheet; and at least one reflective layer formed between the two adjacent light sources, wherein a portion of the reflective layer extends between two of the light guide units corresponding to the two light sources.

In one embodiment, the backlight module further comprises a back bezel, and the bottom structure of the back bezel is a step-like structure.

In one embodiment, the backlight module further comprises a back bezel, and the bottom structure of the back bezel is an inverted V-shaped structure.

In one embodiment, the reflective surfaces are formed on portions of bottom surfaces, end surfaces or inclined end surfaces of the light guide units.

In one embodiment, the shape of the light guide units is rectangle, and the reflective surfaces are scattering dot patterns.

In one embodiment, he surfaces of the light guide units for reflection are inclined surfaces, and the reflective surfaces are adhesive reflective sheets or coated reflective films.

In one embodiment, the reflective surfaces have V-cut structures, a frosted surface, or scattered patterns.

In one embodiment, a receiving space is formed at the bottom of the light guide units to receive devices of the display apparatus.

In one embodiment, the reflective layer is a portion of a U-shaped or L-shaped reflective lampshade.

In one embodiment, the reflective layer is made of a buffer material.

In one embodiment, the display apparatus further comprises a back bezel which includes a supporting frame, and the structure of the supporting frame can correspond to the stacked structure of the light guide units to support them.

In one embodiment, a receiving space is formed at the bottom of the light guide units to receive electronic devices or circuit devices of the display apparatus.

In comparison with the conventional local dimming method which has LED chips disposed at two sides of a light guide plate, the backlight module and the display apparatus of the present invention can comprise the light sources disposed at two sides of the stacked light guide units, wherein each of the light sources corresponds to one of the light guide units. Therefore, the light of the center region of the backlight module can be locally dimmed for improving the local dimming effect. Furthermore, the backlight module of the present invention can enhance the number of the locally dimmed regions and reduce the light interference between the different lighting regions.

The structure and the technical means adopted by the present invention to achieve the above and other objects can be best understood by referring to the following detailed description of the preferred embodiments and the accompanying drawings:

DETAILED DESCRIPTION OF THE PREFERRED EMBODIMENTS

The following embodiments are exemplified by referring to the accompanying drawings, for describing specific embodiments implemented by the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

In the drawings, like reference numerals indicate like components or items.

Figure 1:
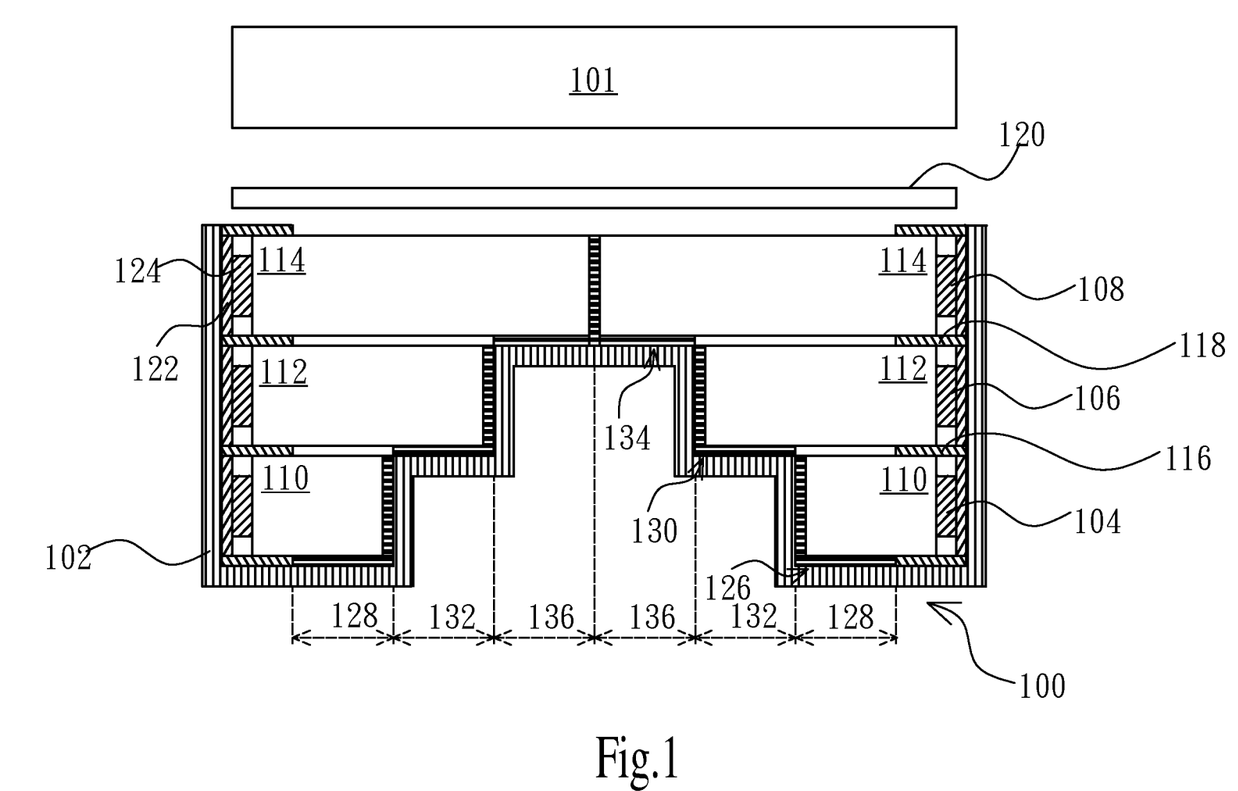
FIG. 1 is a cross-sectional view showing a backlight module and a display panel according to a first embodiment of the present invention.

Referring to FIG. 1, a cross-sectional view showing a backlight module and a display panel according to a first embodiment of the present invention is illustrated. The backlight module 100 of the present embodiment may be for example an edge-lighting type backlight module and disposed opposite to a display panel 101 (such as a liquid crystal display panel), thereby forming a display apparatus (an LCD apparatus). The backlight module 100 comprises a back bezel 102, a plurality of first light sources 104, a plurality of second light sources 106, a plurality of third light sources 108, a plurality of first light guide units 110, a plurality of second light guide units 112, a plurality of third light guide units 114, a first reflective layer 116, a second reflective layer 118 and at least one optical film 120. The back bezel 102 is configured to carry components of the backlight module 100. At least two of the light sources 104, 106, 108 are disposed at one side of the light guide units 110, 112, 114 to emit light into the light guide units 110, 112, 114. The light guide units 110, 112, 114 corresponding to the light sources 104, 106, 108 are stacked at one side of the light sources 104, 106, 108 for guiding light into the display panel 101. The reflective layer 116 or 118 is formed between each adjacent two of the light sources 104, 106, 108, wherein a portion of the reflective layer 116 or 118 extends between two of the light guide units 110, 112, 114 corresponding to the two adjacent light sources 104, 106, 108. The first reflective layer 116 is disposed between the first light sources 104 and the second light sources 106 for separating the light of the first light sources 104 and the second light sources 106. The second reflective layer 118 is disposed between the second light sources 106 and the third light sources 108 for separating the light of the second light sources 106 and the third light sources 108. The optical film 120 may be a diffuser, a prism sheet, a turning prism sheet, a brightness enhancement film (BEF), a dual brightness enhancement film (DBEF), a diffused reflective polarizer film (DRPF) or any combination thereof disposed above the third light sources 108 for optical improvement.

Referring to FIG. 1 again, the back bezel 102 of the present embodiment may be made of an opaque material, such as plastic, metal or any combination material thereof. A bottom structure of the back bezel 102 preferably corresponds to the stacked structure of the light guide units 110, 112, 114 for securely supporting the light guide units 110, 112, 114. For example, in the present embodiment, the bottom structure of the back bezel 102 may be a step-like structure for supporting the light guide units 110, 112, 114. Furthermore, the back bezel 102 may be formed as one-piece (referring to FIG. 2A), but not limited to, for example, the back bezel 102 may also be assembled by two symmetrical parts.

Referring to FIG. 1 again, the light sources 104, 106, 108 are disposed at one side or two opposite sides of the back bezel 102 to emit light to the light guide units 110, 112, 114. The light sources 104, 106, 108 are, for example, cold cathode fluorescent lamps (CCFLs), light emitting diodes (LEDs), organic light emitting diodes (OLEDs), electro-luminescence (EL) devices, light bars or any combination thereof.

Referring to FIG. 1 again, in the present embodiment, the light sources 104, 106, 108 may be for example light bars which include circuit broads 122 and lighting elements 124 (such as LED chips). The circuit broads 122 may be printed circuit boards (PCB) or flexible printed circuits (FPC). The lighting elements 124 are disposed on the circuit broads 122.

Referring to FIG. 1 again, the first light sources 104 of the present embodiment are disposed at one side of the first light guide units 110 to emit light thereto. The second light sources 106 are disposed at one side of the second light guide units 112 to emit light thereto. The third light sources 108 are disposed at one side of the third light guide units 114 to emit light thereto. The first light sources 104, the second light sources 106 and the third light sources 108 are arranged abreast in the same side of the backlight module 100.

Referring to FIG. 1 again, the light guide units 110, 112, 114 of the present embodiment may be made by the method of injection molding, and the material thereof may be photo-curable resin, polymethylmethacrylate (PMMA) or polycarbonate (PC). The light guide units 110, 112, 114 may be assembled as a light guide plate for guiding the light of light sources 104, 106, 108 toward the liquid crystal display panel 101. Each of the light guide units 110, 112, 114 can correspond to one of the light sources 104, 106, 108 for guiding the light thereof, i.e. each of the light guide units 110, 112, 114 can form a lighting region. Therefore, the light guide units 110, 112, 114 can form a plurality of lighting regions on the backlight module 100, and the lighting regions of the backlight module 100 can be locally dimmed, i.e. the lighting regions thereof can have identical or different brightness. The length of the third light guide units 114 is larger than the length of the second light guide units 112, and the length of the second light guide units 112 is larger than the first light guide units 110. Furthermore, the light guide units 110, 112, 114 are stacked as the step-like structure.

Referring to FIG. 1 again, the light guide units 110, 112, 114 of the present embodiment are disposed at one side of the light sources 104, 106, 108. In the present embodiment, the first light guide units 110 have first reflective surfaces 126 which are formed on portions of the first light guide units 110 for reflecting the light of the first light sources 104, thereby forming first lighting regions 128. The second light guide units 112 are disposed on the first light guide units 110 and have second reflective surfaces 130 which are formed on portions of the second light guide units 112 for reflecting the light of the second light sources 106, thereby forming second lighting regions 132. In this case, the distance between the second reflective surfaces 130 and the second light sources 106 is larger than the distance between the first reflective surfaces 126 and the first light sources 104, i.e. the distance between the second lighting regions 132 and the second light sources 106 is larger than the distance between the first lighting regions 128 and the first light sources 104. The third light guide units 114 are disposed on the second light guide units 112 and have third reflective surfaces 134 which are formed on portions of the third light guide units 114 for reflecting the light of the third light sources 108, thereby forming third lighting regions 136. In this case, the distance between the third reflective surfaces 134 and the third light sources 108 is larger than the distance between the second reflective surfaces 130 and the second light sources 106, i.e. the distance between the third lighting regions 136 and the third light sources 108 is larger than the distance between the second lighting regions 132 and the second light sources 106.

Therefore, the reflective surfaces 126, 130, 134 of the light guide units 110, 112, 114 can reflect the light of the light sources 104, 106, 108 correspondingly, thereby forming the lighting regions 128, 132, 136 at different locations.

Referring to FIG. 1 again, the reflective surfaces 126, 130, 134 of the present embodiment may be formed on portions of end surfaces of the light guide units 110, 112, 114 corresponding to the light sources 104, 106, 108 for reflecting light. The reflective surfaces 126, 130, 134 may include reflective sheets or reflective films which may be made of a highly reflective material, such as Ag, Al, Au, Cr, Cu, In, Ir, Ni, Pt, Re, Rh, Sn, Ta, W, Mn, alloy of any combination thereof, white reflective paint with etiolation-resistant and heat-resistant properties or any combination thereof for reflecting light.

In one embodiment, the reflective surfaces 126, 130, 134 may have light guiding structures (not shown) formed thereon to guide the light to output. The light guiding structures of the reflective surfaces 126, 130, 134 may be a plurality of continuous V-cut structures, a frosted surface, or a plurality of scattered patterns, thereby guiding the light of the light sources 104, 106, 108 to be outputted from the lighting regions 128, 132, 136.

Referring to FIG. 1 again, in the present embodiment, the light sources 104, 106, 108 are disposed at two opposite sides of the backlight module 100, and thus two first light guide units 110, two second light guide units 112 and two third light guide units 114 are stacked corresponding to the light sources 104, 106, 108.

Referring to FIG. 1 again, the reflective layers 116, 118 are disposed between the light guide units 110, 112, 114, respectively, for separating the light of the different light sources 104, 106, 108 and improving the light interference problem between the different lighting regions. Furthermore, the reflective layers 116, 118 between the light guide units 110, 112, 114 may be made of a buffer material, such as thermoplastic elastomer, to provide buffer effect, thereby reducing the impact influence between the light guide units 110, 112, 114. The reflective layers 116, 118 may be, for example, reflective sheets or reflective coating layers with reflectivity. In this case, a portion of the first reflective layer 116 extends between the first light guide unit 110 and the second light guide units 112, and a portion of the second reflective layers 118 extends between the second light guide units 112 and the third light guide units 114. That is, the reflective layers 116, 118 may have a predetermined length and extend between the light guide units 110, 112, 114 for separating the light of the different light sources 104, 106, 108. The extending predetermined length of the reflective layers 116, 118 may determined or adjusted according to the forming position of the reflective surfaces 126, 130, 134 of the light guide units 110, 112, 114 (i.e. the forming position of the lighting regions 128, 132, 136) to achieve the optimum light separation effect.

Figure 2A:
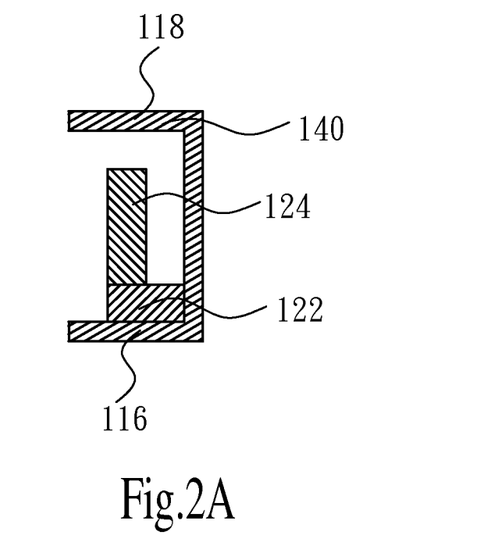
FIG. 2A and FIG. 2B are cross-sectional views showing light sources and reflective lampshades according to one embodiment of the present invention.
Figure 2B:
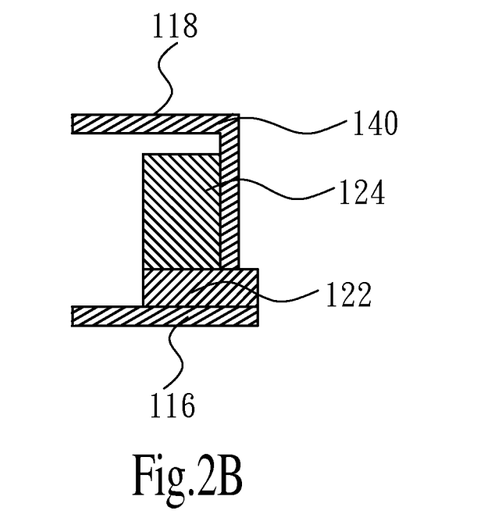

Referring to FIG. 2A and FIG. 2B, cross-sectional views showing the light sources and reflective lampshades according to one embodiment of the present invention is illustrated. In one embodiment, the reflective layers 116, 118 may be provided by a U-shaped reflective lampshade 140 (referring to FIG. 2A) or a L-shaped reflective lampshade 140 (referring to FIG. 2B), i.e. the reflective layer 116 or 118 is a portion of the U-shaped or L-shaped reflective lampshade 140. The light sources 104, 106, 108 may be light bars assembled by the circuit broads 122 and the lighting elements 124 and disposed inside the reflective lampshade 140.

Therefore, the backlight module 100 of the present embodiment may include the light sources 104, 106, 108 disposed at two sides of the stacked light guide units, and each of the light sources corresponds to one of the light guide units to perform the local dimming, thereby allowing the center lighting region of the backlight module 100 to be dimmed for improving the local dimming effect. Furthermore, the light interference problem between the different lighting regions of the backlight module 100 can be improved by the reflective layers 116, 118 between the light sources 104, 106, 108. Accordingly, cost and energy consumption can be reduced. Meanwhile, since the light interference problem between the different lighting regions can be improved, the local dimming effect of the backlight module 100 can be enhanced.

Figure 3:
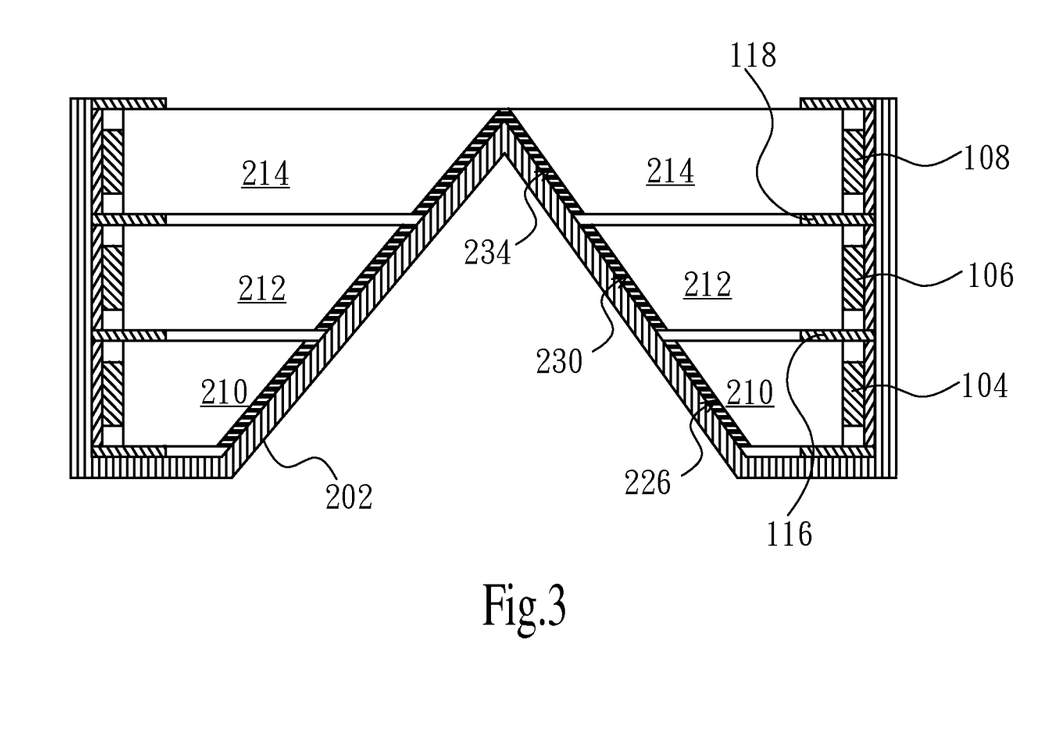
FIG. 3 is a cross-sectional view showing a backlight module according to a second embodiment of the present invention.

Referring to FIG. 3, a cross-sectional view showing a backlight module according to a second embodiment of the present invention is illustrated. In this embodiment, the reflective surfaces 226, 230, 234 of the light guide units 210, 212, 214 are formed on inclined end surfaces thereof. That is, the reflective surfaces 226, 230, 234 are formed at one side of the light guide units 210, 212, 214, respectively, and there is a predetermined angle between the reflective surfaces 226, 230, 234 and the bottom surfaces of the light guide units 210, 212, 214 for reflecting the light of the light sources 104, 106, 108 to form the lighting regions 128, 132, 136 (similar to FIG. 1). At this time, the bottom structure of the back bezel 202 can correspond to the inclined surfaces of the light guide units 210, 212, 214 to be a V-shaped structure for supporting the light guide units 210, 212, 214.

Figure 4A:
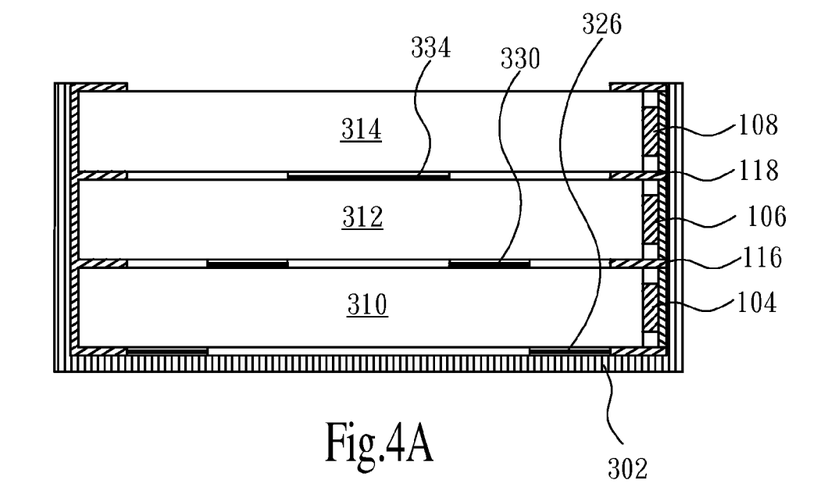
FIG. 4A and FIG. 4B are cross-sectional views showing a backlight module according to a third embodiment of the present invention.
Figure 4B:
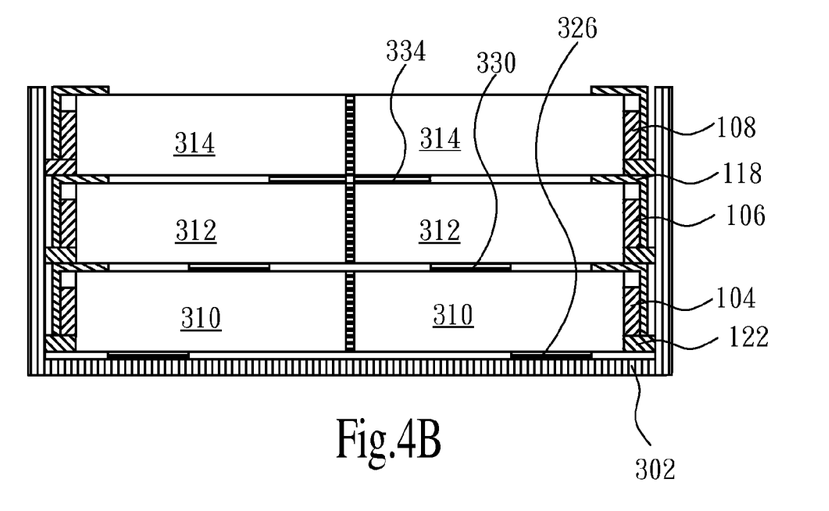

Referring to FIG. 4A and FIG. 4B, cross-sectional views showing a backlight module according to a third embodiment of the present invention are illustrated. In this embodiment, the light sources 104, 106, 108 are disposed at one side (referring to FIG. 4A) or two opposite sides (referring to FIG. 4B) of the back bezel 102. The light guide units 310, 312, 314 may be flat plate structures which are stacked corresponding to the light sources 104, 106, 108 and supported by the back bezel 302. The length of the light guide units 310, 312, 314 are identical. At this time, Each of the light guide units 310, 312, 314 may have one or more reflective surfaces 326, 330, 334 for reflecting the light of the light sources 104, 106, 108 correspondingly to form the lighting regions 128, 132, 136 (similar to FIG. 1).

Figure 5A:
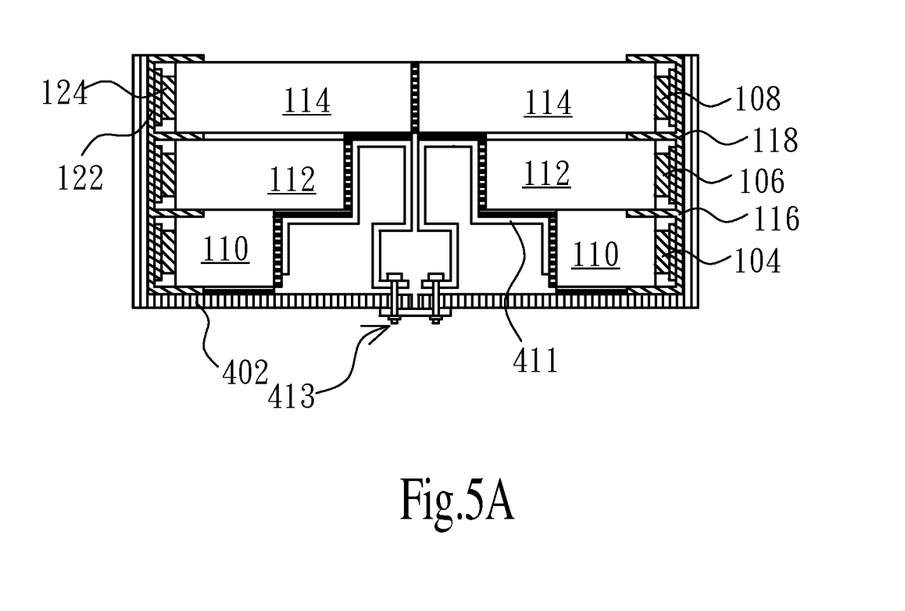
FIG. 5A and FIG. 5B are cross-sectional views showing a backlight module according to a fourth embodiment of the present invention.
Figure 5B:
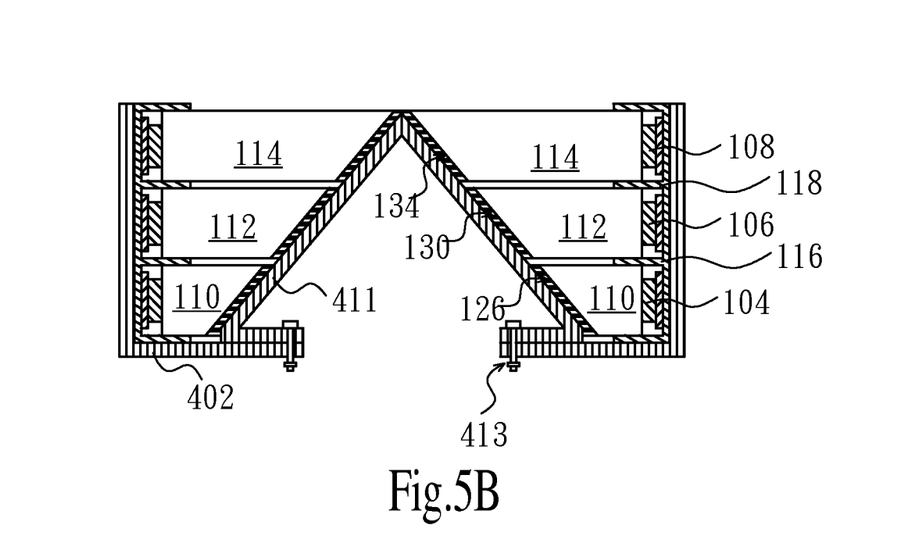

Referring to FIG. 5A and FIG. 5B, cross-sectional views showing a backlight module according to a fourth embodiment of the present invention are illustrated. In this embodiment, the back bezel 402 may include a supporting frame 411. The structure of the supporting frame 411 may correspond to the stacked structure of the light guide units 110, 112, 114 for supporting them securely. For example, the supporting frame 411 may be a step-like structure (referring to FIG. 5A) or an inverted V-shaped structure (referring to FIG. 5B), and mounted to the back bezel 402 by fastening elements 413, such as bolts, rivets, screw holes or screws.

Figure 6A:
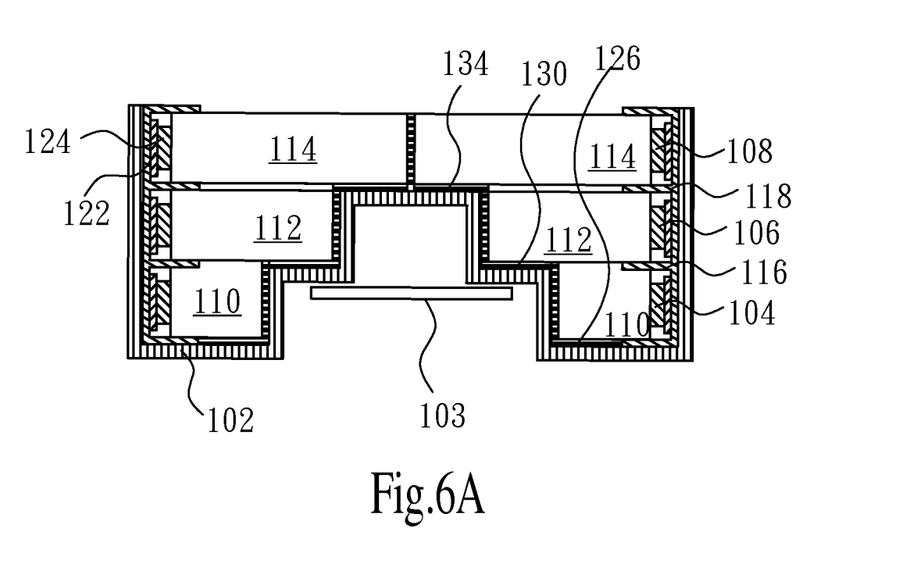
FIG. 6A and FIG. 6B are cross-sectional views showing a backlight module according to one embodiment of the present invention.
Figure 6B:
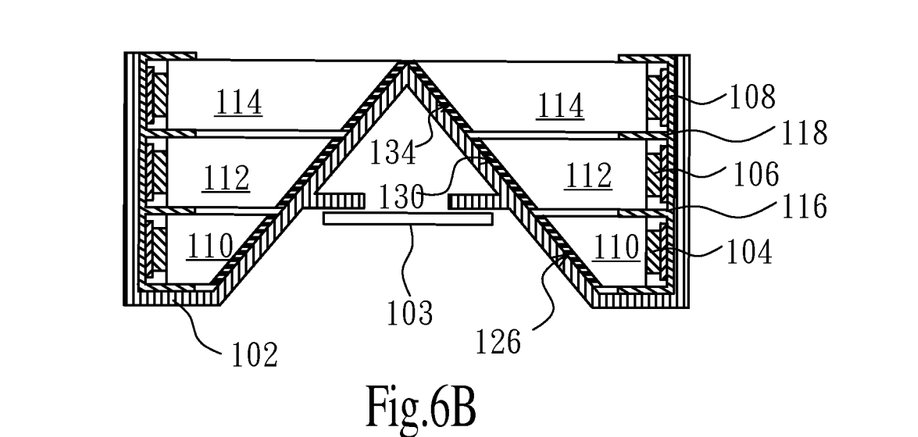

Referring to FIG. 6A and FIG. 6B, cross-sectional views showing a backlight module according to one embodiment of the present invention are illustrated. In one embodiment, a receiving space may be formed at the bottom of the stacked light guide units 110, 112, 114, and the receiving space may be step-like (referring to FIG. 6A) or inverted V-shaped (referring to FIG. 6B). The receiving space may be configured to receive devices 103 of the display apparatus for saving space. The devices 103 may be electronic or circuit devices, such as control circuit board, power supply converter or image signal driver.

A person skilled in the art would understand that the above-mentioned light sources and the corresponding light guide units may be two-layer structure, four-layer structure or more layers, but not limited to the three-layer structure. The light guide units are disposed at one side of the light sources correspondingly.

In the above-mentioned embodiments, the reflective surfaces may be reflective sheets, reflective films or scattering dot patterns. When the shape of the light guide units is rectangle (referring to FIG. 3, FIG. 5A, FIG. 6A), the reflective surfaces are preferably scattering dot patterns for scattering light. When the surfaces of the light guide units for reflection are inclined surfaces (referring to FIG. 3, FIG. 5B, FIG. 6B), the reflective surfaces are preferably reflective material layer, such as adhesive reflective sheets or coated reflective films.

As described above, the backlight module and the display apparatus of the present invention can perform local dimming by the stacked light guide units and the light sources disposed at two sides thereof, wherein each of the light sources corresponds to one of the light guide units. Therefore, the light of the center region of the backlight module can be locally dimmed. Moreover, in the backlight module of the present invention, a portion of each of the reflective layers can extend between the two light guide units corresponding to the two light sources. Accordingly, the reflective layers between the light sources can be used to reduce the light interference between the different lighting regions.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A display apparatus, characterized in that: the display apparatus comprises:
   a display panel; and
   a backlight module comprising:
   at least two light sources;
   a plurality of light guide units corresponding to the light sources and disposed at one side of the light sources;
   at least one reflective layer formed between the two adjacent light sources, wherein a portion of the reflective layer extends between two of the light guide units corresponding to the two light sources; and
   a back bezel for supporting the light guide units, wherein the back bezel includes a supporting frame, and the supporting frame is a step-like structure or an inverted V-shaped structure, and the supporting frame is mounted to the back bezel by fastening elements;
   wherein reflective surfaces are formed on portions of bottom surfaces and end surfaces of the light guide units while the light guide units are stacked as the step-like structure, or the reflective surfaces are formed on inclined end surfaces of the light guide units while the light guide units are stacked as the inverted V-shaped structure;
   wherein a receiving space is formed at the bottom of the light guide units to receive devices of a display apparatus when the light guide units are stacked as the step-like structure or the inverted V-shaped structure.

2. A backlight module, characterized in that: the backlight module comprises:
   at least two light sources;
   a plurality of light guide units corresponding to the light sources and disposed at one side of the light sources;
   at least one reflective layer formed between the two adjacent light sources, wherein a portion of the reflective layer extends between two of the light guide units corresponding to the two light sources; and
   a back bezel for supporting the light guide units, wherein the back bezel includes a supporting frame, and the supporting frame is a step-like structure or an inverted V-shaped structure, and the supporting frame is mounted to the back bezel by fastening elements;
   wherein reflective surfaces are formed on portions of bottom surfaces and end surfaces of the light guide units while the light guide units are stacked as the step-like structure, or the reflective surfaces are formed on inclined end surfaces of the light guide units while the light guide units are stacked as the inverted V-shaped structure;
   wherein a receiving space is formed at the bottom of the light guide units to receive devices of a display apparatus when the light guide units are stacked as the step-like structure or the inverted V-shaped structure.

3. The backlight module according to claim 2, characterized in that: the surfaces of the light guide units for reflection are inclined surfaces.

4. The backlight module according to claim 2, characterized in that: the reflective surfaces are scattering dot patterns.

5. The backlight module according to claim 2, characterized in that: the reflective surfaces are adhesive reflective sheets or coated reflective films.

6. The backlight module according to claim 2, characterized in that: the reflective surfaces have V-cut structures, a frosted surface, or scattered patterns.

7. The backlight module according to claim 2, characterized in that: the reflective layer is a portion of a U-shaped or L-shaped reflective lampshade.

8. The backlight module according to claim 2, characterized in that: the reflective layer is made of a buffer material.

* * * * *